US005673928A

United States Patent [19]
Jury

[11] Patent Number: 5,673,928
[45] Date of Patent: Oct. 7, 1997

[54] FOLDING PORTABLE CART

[76] Inventor: Keith A. Jury, 213 Upper Coleville Rd., Bellefonte, Pa. 16823

[21] Appl. No.: 577,693

[22] Filed: Dec. 22, 1995

[51] Int. Cl.$^6$ ............................................. B62B 1/12
[52] U.S. Cl. ..................... 280/645; 280/652; 280/655; 280/656; 280/47.24
[58] Field of Search .................. 280/30, 639, 651, 280/652, 655, 655.1, 47.17, 47.18, 47.24, 645, 656, 63

[56] References Cited

U.S. PATENT DOCUMENTS

| | | | |
|---|---|---|---|
| 2,401,986 | 6/1946 | Talbott | 280/41 |
| 2,826,425 | 3/1958 | Hoeper | 280/36 |
| 3,177,000 | 4/1965 | Alexander | 280/36 |
| 3,863,946 | 2/1975 | Dotson | 280/36 C |
| 4,316,615 | 2/1982 | Willette | 280/47.26 |
| 4,522,425 | 6/1985 | Cornwall et al. | 280/656 |
| 4,618,157 | 10/1986 | Resnick | 280/8 |
| 5,564,720 | 10/1996 | Stringer | 280/30 |

FOREIGN PATENT DOCUMENTS

| | | | |
|---|---|---|---|
| 2035108 | 7/1992 | Canada | 280/652 |
| 1423447 | 9/1988 | U.S.S.R. | 280/651 |

*Primary Examiner*—Brian L. Johnson
*Assistant Examiner*—Bridget Avery

[57] ABSTRACT

A foldable and portable hand propelled cart for use in transporting game from a hunting site. In its broadest context, the cart construction has both a folded and an unfolded orientation. A method of transporting the cart is provided. The method includes the steps of providing the cart construction as well as two straps which can be affixed to the cart in its folded orientation. In this way, the folded cart can be worn as a backpack.

5 Claims, 3 Drawing Sheets

5,673,928

FOLDING PORTABLE CART

BACKGROUND OF THE INVENTION

1. Field of the Invention

The present invention relates to a folding portable cart and more particularly pertains to such a cart for use in hunting.

2. Description of the Prior Art

The use of carts is known in the prior art. More specifically, carts heretofore devised and utilized for the purpose of transporting articles are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,295,556 to Mullin a multipurpose hunting cart. U.S. Design Pat. Nos. 333,370; 327,968; 312,716 and 257,587 all disclose game and or hunting cart designs. Finally, Design Pat. No. 312,164 illustrates a design on a hunting instrument.

In this respect, the folding portable cart according to the present invention substantially departs from the conventional concepts and designs of the prior art, and in doing so provides an apparatus primarily developed for the purpose of transporting game from a hunting site.

Therefore, it can be appreciated that there exists a continuing need for new and improved folding portable cart which can be used for transporting game from a hunting site. In this regard, the present invention substantially fulfills this need.

SUMMARY OF THE INVENTION

In view of the foregoing disadvantages inherent in the known types of carts now present in the prior art, the present invention provides an improved folding portable cart. As such, the general purpose of the present invention, which will be described subsequently in greater detail, is to provide a new and improved folding portable cart and method which has all the advantages of the prior art and none of the disadvantages.

To attain this, the present invention essentially comprises a foldable and portable hand propelled cart for use in transporting game from a hunting site. The cart includes a forward rectangular frame member which has a first end, a second end, a top and a bottom, and a threaded aperture which is formed within the top first end. An intermediate rectangular frame member is also included which has a first end, a second end, a top, a bottom, a first half and a second half, a first cross brace interconnecting the first and second ends of the first half, a second cross brace interconnecting the first and second ends of the second half, a first slot positioned within the first cross brace, and a second slot positioned within the second cross brace. A first set of hinges serve to interconnect the bottom second end of the forward frame member to the bottom first end of the intermediate frame member, thus the first set of hinges pivotally interconnect the forward frame member to the intermediate frame member. A rearward rectangular frame member is also included which has a first end, a second end, a top and a bottom. A second set of hinges serve to interconnect the top second end of the intermediate frame member to the top first end of the rearward frame member. The second set of hinges thereby pivotally interconnects the intermediate frame member to the rearward frame member. A first side axle assembly is included which has a primary strut, the primary strut having a first end and a second end, the first end of the primary strut is pivotally connected to the first half of the intermediate frame member, and the second end including means to releasably attach a wheel. A secondary strut member is included which has a first end and a second end, the first end slidably received within the slot formed within the first cross brace, the second end pivotally interconnected to the second end of the primary strut thereby enabling the first side axle assembly to be pivoted relative to the intermediate frame member. The cart also includes a first means for releasably securing the first end of the secondary strut of the first side axle assembly within the slot of the first cross brace. The second side axle assembly includes a primary strut, the primary strut having a first end and a second end, the first end of the primary strut is pivotally connected to the second half of the intermediate frame member, the second end including means to releasably attach a wheel. A secondary strut member is included which has a first end and a second end, the first end slidably received within the slot formed within the second cross brace, the second end is pivotally interconnected to the second end of the primary strut thereby enabling the second side axle assembly to be pivoted relative to the intermediate frame member. Furthermore, the cart also includes a second means for releasably securing the first end of the secondary strut of the second side axle assembly within the slot of the second cross brace. A handle which has a first end and a second end and an intermediate extent therebetween, and wherein the second end is threaded and adapted to be removably secured within the threaded aperture of the forward rectangular frame is included with the cart. The cart employs a first wheel which is releasably secured to the second end of the primary strut of the first side axle assembly. Likewise, a second wheel is releasably secured to the second end of the primary strut of the second side axle assembly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved folding portable cart which have all the advantages of the prior art carts and none of the disadvantages.

It is another object of the present invention to provide new and improved folding portable cart which may be easily and efficiently manufactured and marketed.

It is further object of the present invention to provide new and improved folding portable cart which are of durable and reliable constructions.

An even further object of the present invention is to provide new and improved folding portable cart which are susceptible of a low cost of manufacture with regard to both materials and labor, and which accordingly are then susceptible of low prices of sale to the consuming public, thereby making such folding portable cart economically available to the buying public.

Still yet another object of the present invention is to provide new and improved folding portable cart which provide in the apparatuses and methods of the prior art some of the advantages thereof, while simultaneously overcoming some of the disadvantages normally associated therewith.

Even still another object of the present invention is to enable a hunter to wear a hunting type cart upon his or her back.

Lastly, it is an object of the present invention to provide new and improved foldable and portable hand propelled cart for use in transporting game from a hunting site. In its broadest context, the present invention provides a cart construction which has both a folded and an unfolded orientation. The present invention also relates to a method of transporting the cart. The method includes the steps of providing the cart construction as well as two straps which can be affixed to the cart in its folded orientation. In this way, the folded cart can be worn as a backpack. The various details as to the cart construction, as well as the method of transporting it, will be described in greater detail hereinafter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
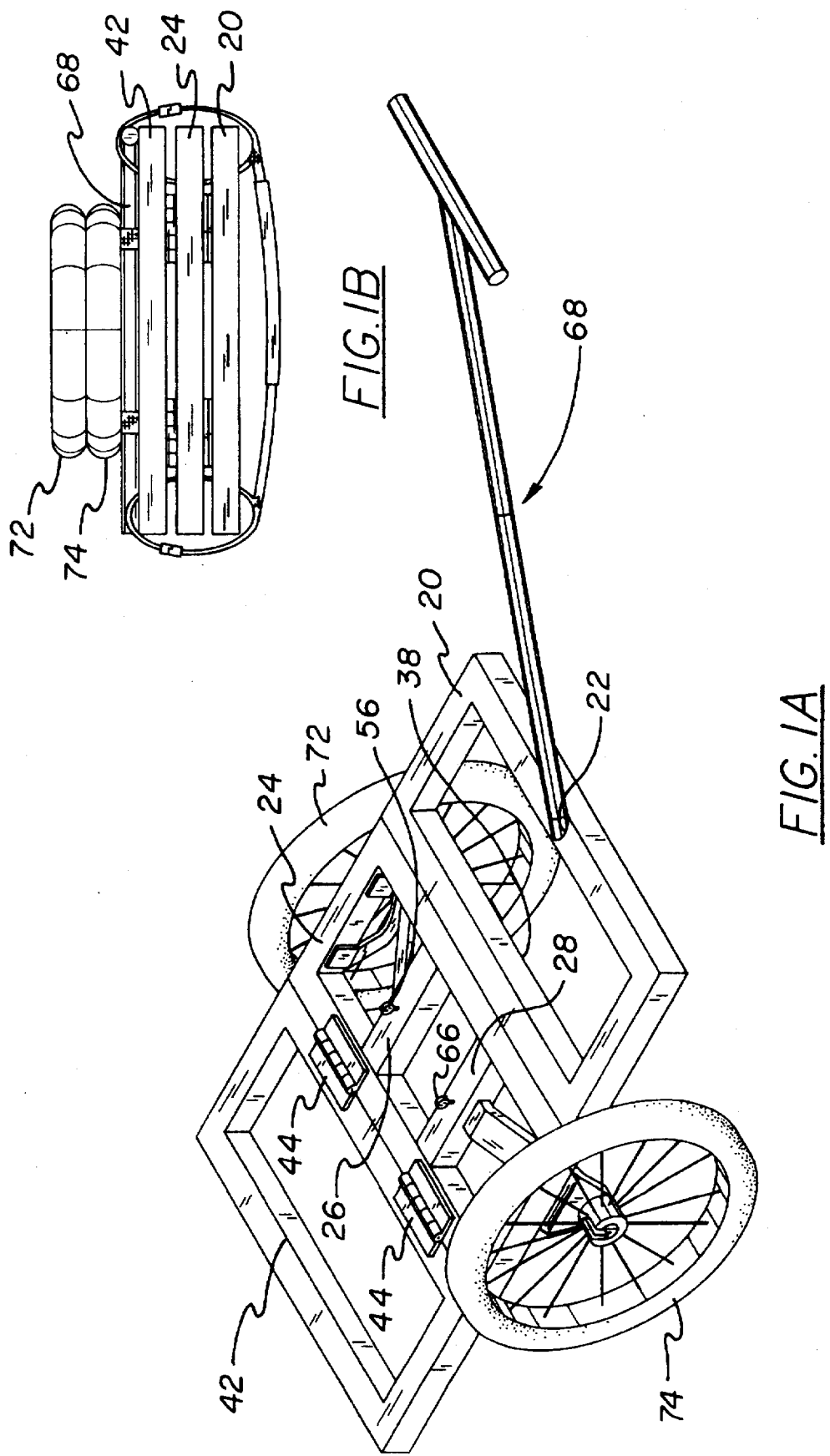
FIG. 1a is a perspective view of the preferred embodiment of the folding portable cart constructed in accordance with the principles of the present invention.
FIG. 1b is a view of the cart in its folded orientation, with the backpack straps attached.
Figure 2:
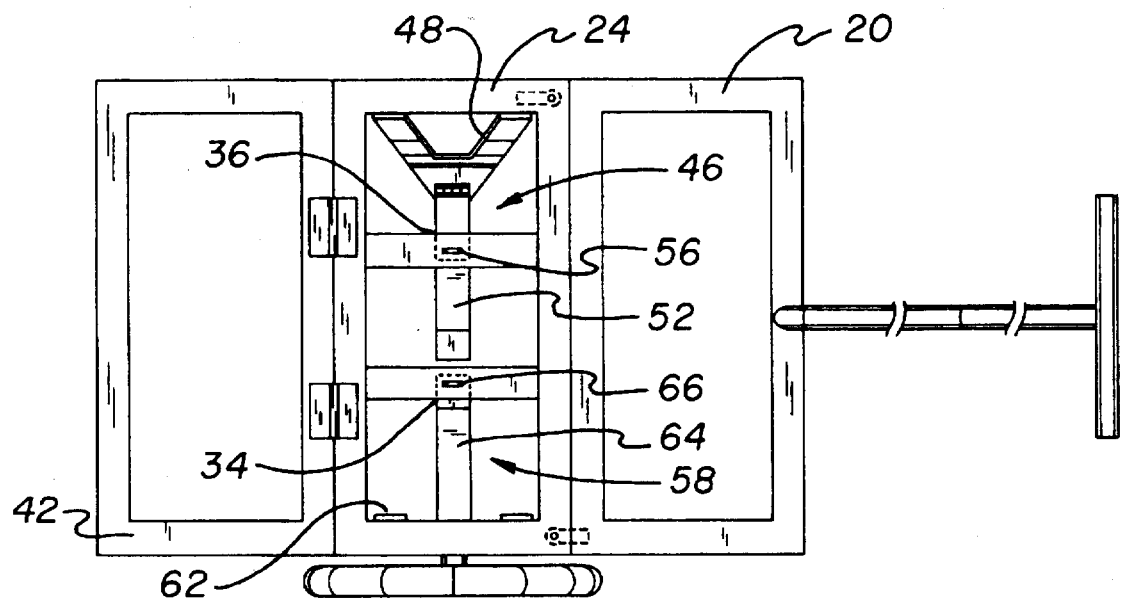
FIG. 2 is a plan view of the cart of the present invention.
Figure 3:
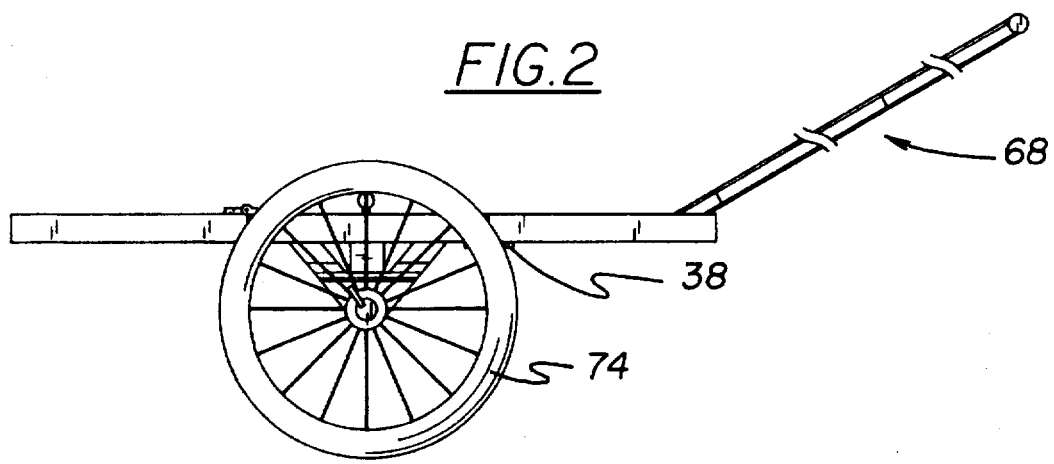
FIG. 3 is a side view of the cart of the present invention.
Figure 4:
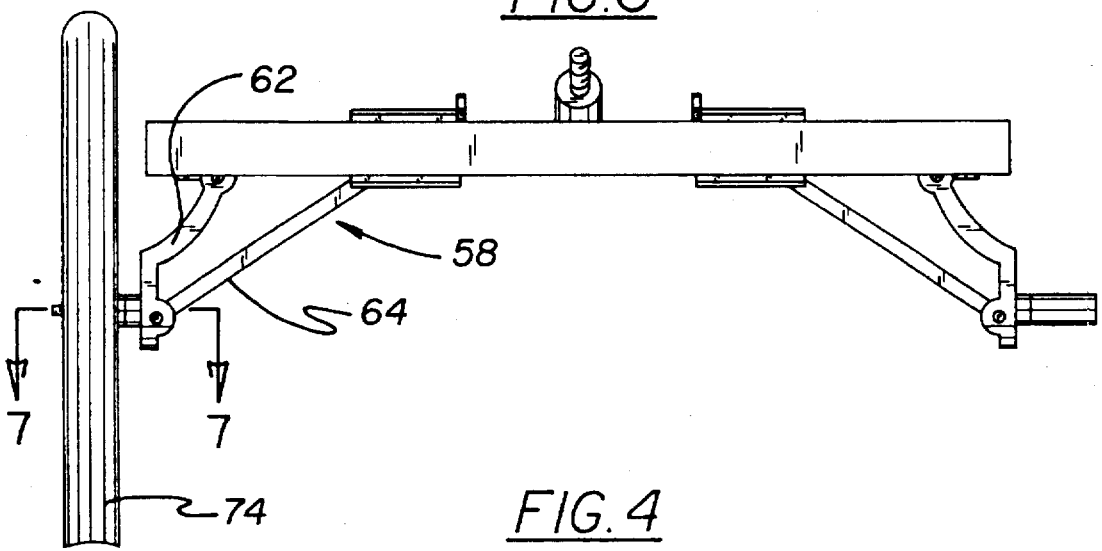
FIG. 4 is a view of one of the axle assemblies.
Figure 5:
FIG. 5 is a view of a segment of the handle.
Figure 6:
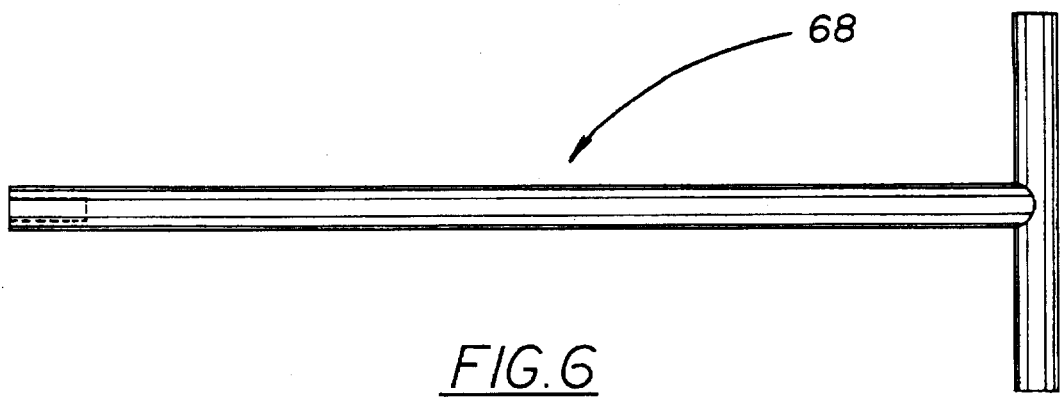
FIG. 6 is a view of a segment of the handle.
Figure 7:
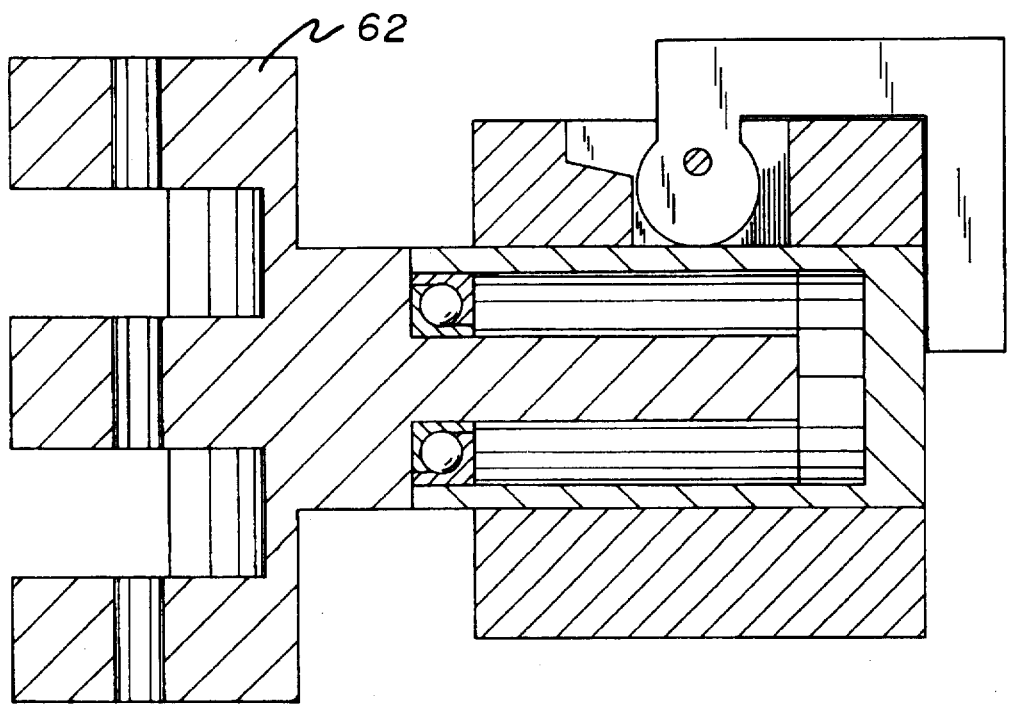
FIG. 7 is a view taken along line 7—7 of FIG. 4.

With reference now to the drawings, and in particular to FIG. 1 thereof, the preferred embodiment of the new and improved folding portable cart embodying the principles and concepts of the present invention and generally designated by the reference numeral 10 will be described.

The present invention relates to a foldable and portable hand propelled cart for use in transporting game from a hunting site. In its broadest context, the present invention provides a cart construction which has both a folded and an unfolded orientation. The present invention also relates to a method of transporting the cart. The method includes the steps of providing the cart construction as well as two straps which can be affixed to the cart in its folded orientation. In this way, the folded cart can be worn as a backpack. The various details as to the cart construction, as well as the method of transporting it, Will be described in greater detail hereinafter.

CART CONSTRUCTION

The cart is constructed from a forward, an intermediate and a rearward rectangular frame member. Furthermore, the cart includes two axle assemblies and a removable handle 68.

The forward rectangular frame member is defined by a first end, a second end, a top and a bottom. A threaded aperture 22 is formed within the top first end of the frame member. The aperture functions in retaining one end of the removable handle 68. The intermediate rectangular frame member is defined by a first end, a second end, a top, a bottom, a first half and a second half. Additionally, the intermediate frame includes a first cross brace 26 interconnecting the first and second ends of the first half of the frame. Likewise, a second cross brace 28 serves to interconnecting the first and second ends of the second half of the frame. The first and second axle assemblies are pivotally connected to the first and second sides of the intermediate frame assembly respectively. In order to achieve the connection, a first slot 34 is positioned within the first cross brace 26. Likewise, a second slot 36 is positioned within the second cross brace 28. The details of the connection between the first and second axle assemblies and the intermediate frame will be described in greater detail hereinafter. Lastly, the rearward rectangular frame member is defined by a first end, a second end, a top and a bottom.

A plurality of hinges are employed to pivotally interconnect the forward frame member 20 to the intermediate frame member 24. In the preferred embodiment, a set of hinges 38 are employed. Specifically, the hinges 38 interconnect the bottom second end of the forward frame member 20 to the bottom first end of the intermediate frame member 24. In a similar fashion, a plurality of hinges 44 are employed to pivotally interconnect the intermediate frame member 24 to the rearward frame member 42. In the preferred embodiment a set of hinges are employed. Specifically, the hinges interconnect the top second end of the intermediate frame member 24 to the top first end of the rearward frame member 42. Furthermore, a set of pivotal latches can be employed between the forward and intermediate as well as between the rearward and intermediate frame member 24s. These pivotal latches are employed in keeping the frame members in their unfolded orientation. Alternatively, the latches can be pivoted to allow the frame members to be pivoted relative to one another.

The first and second axle assemblies will now be described. The first side axle assembly 46 employs a primary strut 48 and a secondary strut 52. The primary strut 48 has a first end and a second end. The first end of the primary strut 48 is pivotally connected to the first half of the intermediate frame member 24. Means to releasably attach a wheel are included at the second end of the primary strut 48. The secondary strut 52 member has a first end and a second end, with the first end slidably received within the slot formed within the first cross brace 26. The second end of the secondary strut 52 is pivotally interconnected to the second end of the primary strut 48. Thus, the construction described enables the first side axle assembly 46 to be pivoted relative to the intermediate frame member 24. However, in order to retain the axle assembly in an unfolded orientation, with the primary strut 90 degrees relative to the intermediate frame member 24, a securing means is included. More specifically, a first means 56 for releasably securing the first end of the secondary strut 52 of the first side axle assembly 46 within the slot of the first cross brace 26. In the preferred embodiment, the means takes the form of a thumb screw which screws into the first cross brace 26 and selectively applies pressure to the secondary strut 52. The second side axle assembly 58 is identical to the first. Consequentially, the many of details as to the second side axle assembly 58 will be omitted. However, the essential details of the second side axle assembly 58 are as follows. The first end of the primary strut 62 of the second side axle assembly 58 is pivotally connected to the second half of the intermediate frame member 24. Furthermore, the first end of the secondary strut 64 is slidably received within the slot formed within the second cross brace 28. Furthermore, second means 66 are included for releasably securing the first end of the secondary strut 64 of the second side axle assembly 58 within the slot of the second cross brace 28. In the preferred embodiment this second means 66 takes the form of a thumb screw.

A handle 68 is employed in the cart construction. The handle 68 is defined by a first end and a second end with an intermediate extent therebetween. The second end is threaded and is adapted to be removably secured within the threaded aperture 22 of the forward rectangular frame. Furthermore, in the preferred embodiment, the handle 68 is a two part handle with a threaded interconnection within its intermediate extent.

The cart includes a first and second wheel 74s which are removably secured to the first and second axle assemblies respectively. In the preferred embodiment these are 16" spoked wheels. The first wheel 72 is releasably secured to the second end of the primary strut 48 of the first side axle assembly 46. Furthermore, the second wheel 74 is releasably secured to the second end of the primary strut 62 of the second side axle assembly 58.

METHOD OF TRANSPORTING THE CART

The present invention also relates to a method of transporting the cart on a user's back while the cart is in its folded orientation. The method includes the following steps.

First, providing the described cart construction, namely: providing a forward frame member having a first end, a second end, a top and a bottom; providing an intermediate frame member having a first end, a second and, a top, a bottom, a first half and a second half; providing a plurality hinges interconnecting the bottom second end of the forward frame member to the bottom first end of the intermediate frame member, the first set of hinges thereby pivotally interconnecting the forward frame member to the intermediate frame member; providing a rearward frame member having a first end, a second end, a top and a bottom; providing a plurality hinges interconnecting the top second end of the intermediate frame member to the top first end of the rearward frame member, the second set of hinges thereby pivotally interconnecting the intermediate frame member to the rearward frame member; providing a first side axle assembly pivotally connected to the first side of the intermediate frame member; providing a second side axle assembly pivotally connected to the second side of the intermediate frame member; providing a handle having a first end and a second end and an intermediate extent therebetween, the second end being removably secured within the forward rectangular frame; providing a first wheel releasably secured to the first side axle assembly; providing a second wheel releasably secured to the second side axle assembly.

The next step involves providing a set of straps. Specifically, providing a first strap having a first end and a second end and an intermediate extent therebetween. Attaching the first and second ends of the first strap to opposite ends of one side of the cart in its folded orientation. Providing a second strap having a first end and a second end and an intermediate extent therebetween. Attaching the first and second ends of the second strap to opposite ends of one side (opposite of the side the first strap is applied to) of the cart in its folded orientation. Thereby, securing the first and second straps to the cart while the cart is in the folded orientation. Thus, the cart is enabled to be transported on the back of a user.

Thus, what has been described is a cart construction which is transportable as a backpack. This is achieved by first taking the wheels off the cart. Then the first and second side axle assemblies are folded downward and inward until they are flush with the intermediate frame member. At this time, the handle is unscrewed from the forward frame member. The rearward frame member is then folded onto the intermediate member. The forward frame member is likewise folded onto the intermediate frame member. The two straps are then utilized to encompass the entire collection of parts. The cart assembly can then be worn in a fashion similar to a backpack.

Thus, what has been described is a folding "buck-along" cart which is made from aluminum or other strong, lightweight material. The cart platform is designed with three hinged sections. When opened out for use, the platform measures 18" wide by 30" long. When folded, the unit is a compact 18" by 10" framework that can easily be carried as a backpack. The collapsible 36" pull-handle and detachable 16" spooked ball bearing wheels provide easy pulling of the cart over rough terrain.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A foldable and portable hand propelled cart for use in transporting game from a hunting site, the cart comprising in combination:

a forward rectangular frame member having a first end, a second end, a top and a bottom, a threaded aperture formed within the top first end;

an intermediate rectangular frame member having a first end, a second end, a top, a bottom, a first half and a second half, a first cross brace interconnecting the first and second ends of the first half, a second cross brace interconnecting the first and second ends of the second half, a first slot positioned within the first cross brace, a second slot positioned within the second cross brace;

a first set of hinges interconnecting the bottom second end of the forward frame member to the bottom first end of the intermediate frame member, the first set of hinges thereby pivotally interconnecting the forward frame member to the intermediate frame member;

a rearward rectangular frame member having a first end, a second end, a top and a bottom;

a second set of hinges interconnecting the top second end of the intermediate frame member to the top first end of the rearward frame member, the second set of hinges thereby pivotally interconnecting the intermediate frame member to the rearward frame member;

a first side axle assembly including a primary strut, the primary strut having a first end and a second end, the first end of the primary strut being pivotally connected to the first half of the intermediate frame member, the second end including means to releasably attach a wheel, a secondary strut member having a first end and a second end, the first end slidably received within the slot formed within the first cross brace, the second end pivotally interconnected to the second end of the primary strut thereby enabling the first side axle assembly to be pivoted relative to the intermediate frame member;

first means for releasably securing the first end of the secondary strut of the first side axle assembly within the slot of the first cross brace;

a second side axle assembly including a primary strut, the primary strut having a first end and a second end, the first end of the primary strut being pivotally connected to the second half of the intermediate frame member, the second end including means to releasably attach a wheel, a secondary strut member having a first end and a second end, the first end slidably received within the slot formed within the second cross brace, the second end pivotally interconnected to the second end of the primary strut thereby enabling the second side axle assembly to be pivoted relative to the intermediate frame member;

second means for releasably securing the first end of the secondary strut of the second side axle assembly within the slot of the second cross brace;

a handle having a first end and a second end and an intermediate extent therebetween, the second end being threaded and adapted to be removably secured within the threaded aperture of the forward rectangular frame;

a first wheel releasably secured to the second end of the primary strut of the first side axle assembly;

a second wheel releasably secured to the second end of the primary strut of the second side axle assembly.

2. A foldable and portable hand propelled cart for use in transporting game from a hunting site, the cart comprising in combination:

a forward frame member having a first end, a second end, a top and a bottom;

an intermediate frame member having a first end, a second end, a top, a bottom, a first half and a second half, the intermediate frame includes a first cross brace interconnecting the first and second ends of the fist half, and a second cross brace interconnecting the first and second ends of the second half, a first slot positioned within the first cross brace, a second slot positioned within the second cross brace;

a plurality hinges interconnecting the bottom second end of the forward frame member to the bottom first end of the intermediate frame member, a first set of hinges thereby pivotally interconnecting the forward frame member to the intermediate frame member;

a rearward frame member having a first end, a second end, a top and a bottom;

a plurality of hinges interconnecting the top second end of the intermediate frame member to the top first end of the rearward frame member, a second set of hinges thereby pivotally interconnecting the intermediate frame member to the rearward frame member;

a first side axle assembly pivotally connected to a first side of the intermediate frame member, the first side axle assembly includes a primary strut, the primary strut having a first end and a second end, the first end of the primary strut being pivotally connected to the first half of the intermediate frame member, the second end including means to releasably attach a wheel, a secondary strut member having a first end and a second end, the first end slidably received within the slot formed within the first cross brace, the second end pivotally interconnected to the second end of the primary strut thereby enabling the first side axle assembly to be pivoted relative to the intermediate frame member;

a second side axle assembly pivotally connected to a second side of the intermediate frame member, the second side axle assembly includes a primary strut, the primary strut having a first end and a second end, the first end of the primary strut being pivotally connected to the second half of the intermediate frame member, the second end including means to releasably attach a wheel, a secondary strut member having a first end and a second end, the first end slidably received within the slot formed within the second cross brace, the second end pivotally interconnected to the second end of the primary strut thereby enabling the second side axle assembly to be pivoted relative to the intermediate frame member;

a handle having a first end and a second end and an intermediate extent therebetween, the second end being removably secured within the forward rectangular frame;

a first wheel releasely secured to the first side axle assembly;

a second wheel releasably secured to the second side axle assembly.

3. The cart as described in claim 2 wherein:

the intermediate frame includes a first cross brace interconnecting the first and second ends of the fist half, and a second cross brace interconnecting the first and second ends of the second half, a first slot positioned within the first cross brace, a second slot positioned within the second cross brace; and wherein the first side axle assembly includes a primary strut, the primary strut having a first end and a second end, the first end of the primary strut being pivotally connected to the first half of the intermediate frame member, the second end including means to releasably attach a wheel, a secondary strut member having a first end and a second end, the first end slidably received within the slot formed within the first cross brace, the second end pivotally interconnected to the second end of the primary strut thereby enabling the first side axle assembly to be pivoted relative to the intermediate frame member; and wherein the second side axle assembly includes a primary strut, the primary strut having a first end and a second end, the first end of the primary strut being pivotally connected to the second half of the intermediate frame member, the second end including means to releasably attach a wheel, a secondary strut member having a first end and a second end, the first end slidably received within the slot formed within the second cross brace, the second end pivotally interconnected to the second end of the primary strut thereby enabling the second side axle assembly to be pivoted relative to the intermediate frame member.

4. The cart as described in claim 3 wherein:

the forward frame, the intermediate frame member and the rearward frame member are all rectangular in shape.

5. A portable hand propelled cart for use in transporting game from a hunting site, the cart having a folded and an unfolded orientation, a method of transporting the cart on a user's back, the method comprising:

providing a forward frame member having a first end, a second end, a top and a bottom;

providing an intermediate frame member having a first end, a second end, a top, a bottom, a first half and a second half;

providing a plurality of hinges interconnecting the bottom second end of the forward frame member to the bottom first end of the intermediate frame member, the first set of hinges thereby pivotally interconnecting the forward frame member to the intermediate frame member;

providing a rearward frame member having a first end, a second end, a top and a bottom;

providing a plurality hinges interconnecting the top second end of the intermediate frame member to the top first end of the rearward frame member, the second set of hinges thereby pivotally interconnecting the intermediate frame member to the rearward frame member;

providing a first side axle assembly pivotally connected to a first side of the intermediate frame member;

providing a second side axle assembly pivotally connected to a second side of the intermediate frame member;

providing a handle having a first end and a second end and an intermediate extent therebetween, the second end being removably secured within the forward rectangular frame;

providing a first wheel releasably secured to the first side axle assembly;

providing a second wheel releasably secured to the second side axle assembly;

providing a first strap having a first end and a second end and an intermediate extent therebetween, the first and second ends of the first strap adapted to be secured to one side of the cart in its folded orientation;

providing a second strap having a first end and a second end and an intermediate extent therebetween, the first and second ends of the second strap adapted to be secured to one side of the cart in its folded orientation;

securing the first and second straps to the cart while the cart is in the folded orientation, thereby enabling the folded cart to be transported on the back of a user.

\* \* \* \* \*